Figure 1:
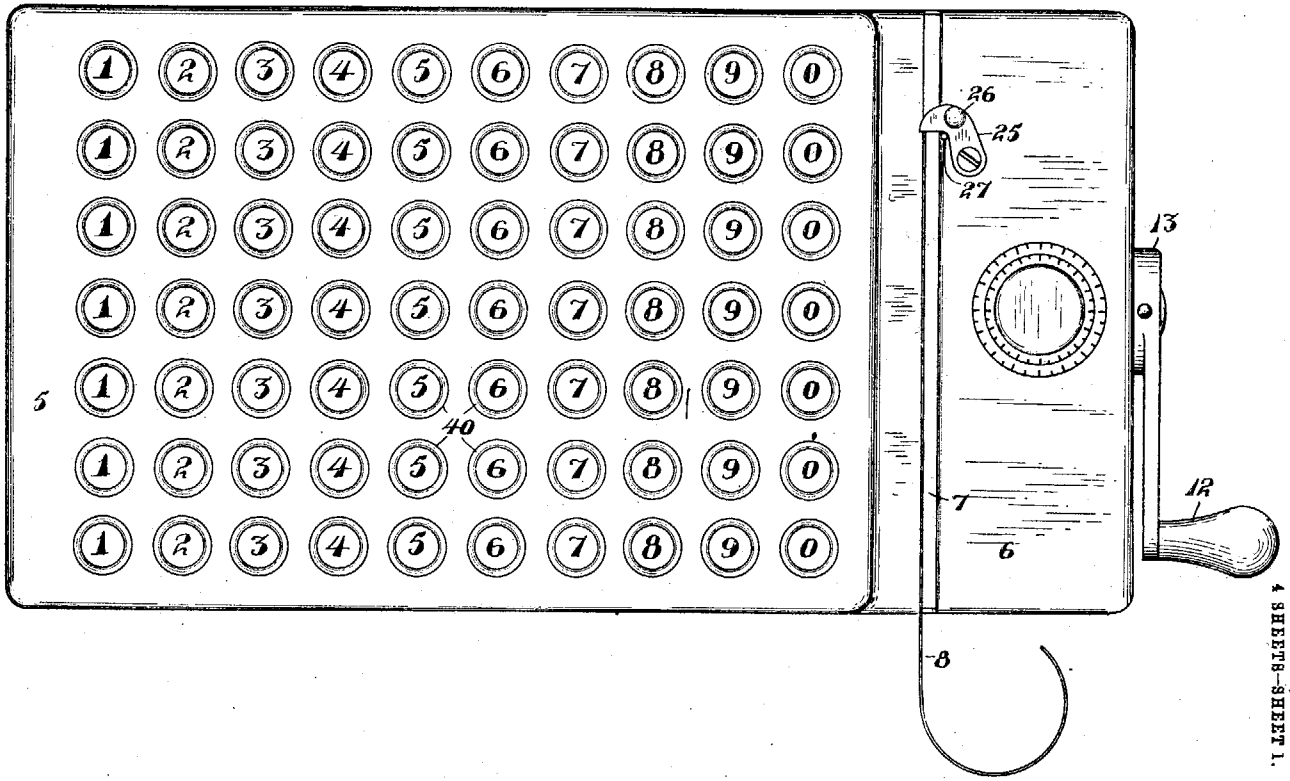

F. HOFFMAN.

CHECK IDENTIFYING MACHINE.

APPLICATION FILED OCT. 28, 1911.

Reissued Nov. 24, 1914.

13,831.

4 SHEETS—SHEET 1.

WITNESSES

F. C. Fliedner

N. B. Keating

INVENTOR

F. Hoffman

BY

F. M. Wright

ATTORNEY

THE NORRIS PETERS CO., PHOTO-LITHO., WASHINGTON, D. C.

F. HOFFMAN.

CHECK IDENTIFYING MACHINE.

APPLICATION FILED OCT. 28, 1911.

Reissued Nov. 24, 1914.

13,831.

4 SHEETS—SHEET 2.

WITNESSES

F. C. Fliedner

N. B. Keating

INVENTOR

F. Hoffman,

BY

F. M. Wright,

ATTORNEY

THE NORRIS PETERS CO., PHOTO-LITHO., WASHINGTON, D. C.

F. HOFFMAN.

CHECK IDENTIFYING MACHINE.

APPLICATION FILED OCT. 28, 1911.

Reissued Nov. 24, 1914.

13,831.

4 SHEETS—SHEET 3.

WITNESSES

F. C. Fliedner

N. B. Keating.

INVENTOR

F. Hoffman

BY

Fm. Wright,

ATTORNEY

THE NORRIS PETERS CO., PHOTO-LITHO., WASHINGTON, D. C.

F. HOFFMAN.

CHECK IDENTIFYING MACHINE.

APPLICATION FILED OCT. 28, 1911.

Reissued Nov. 24, 1914.

13,831.

4 SHEETS—SHEET 4.

WITNESSES

F. C. Fliedner

N. B. Keating

INVENTOR

F. Hoffman

BY

Fm. Wright,

ATTORNEY

THE NORRIS PETERS CO., PHOTO-LITHO., WASHINGTON, D. C.

UNITED STATES PATENT OFFICE.

FRED HOFFMAN, OF OAKLAND, CALIFORNIA, ASSIGNOR, BY MESNE ASSIGNMENTS, TO H. & H. PATENT-DEVELOPING COMPANY, OF OAKLAND, CALIFORNIA, A CORPORATION OF CALIFORNIA.

CHECK-IDENTIFYING MACHINE.

13,831. Specification of Reissued Letters Patent. Reissued Nov. 24, 1914.

Original No. 971,197, dated September 27, 1910, Serial No. 515,901. Application for reissue filed October 28, 1911. Serial No. 657,357.

*To all whom it may concern:*

Be it known that I, FRED HOFFMAN, a citizen of the United States, residing at Oakland, in the county of Alameda and State of California, have invented new and useful Improvements in Check-Identifying Machines, of which the following is a specification.

The object of the present invention is to provide a machine for making perforations, marks, or the like, in or on checks, money orders, drafts, or the like, as a means of identifying the amount to be paid, and the persons to whom it is to be paid and on whom the check or other draft is drawn, in order to prevent the raising of the amount, the forgery of names, false identifications, and the like.

By the preferred form of the machine the draft, money order, or other paper to be identified, is perforated with holes about one-eighth of an inch in diameter, corresponding in location with numerals printed, out of numerical order, on an identification or code card, so that, when said paper so perforated is placed over the identification card, the numbers displayed through the holes thus formed correspond with the numbers constituting the amount of money in said check or the like, and also with the identification numbers of the drawer of the check and of the payee.

While it is preferred to use a machine which perforates the paper, a result of like kind could also be obtained although not so conveniently by using a machine which merely marks the paper, since the value of the device as an identifying means consists essentially in the relative locations of the perforations or marks made by the machine, and, to indicate relative locations, marks are just as effective as perforations. Therefore, while for brevity only, I shall describe and claim the invention as a perforating device, it is understood that there is also included therein the inferior embodiment of my invention in which the machine is merely a marking device.

Figure 2:
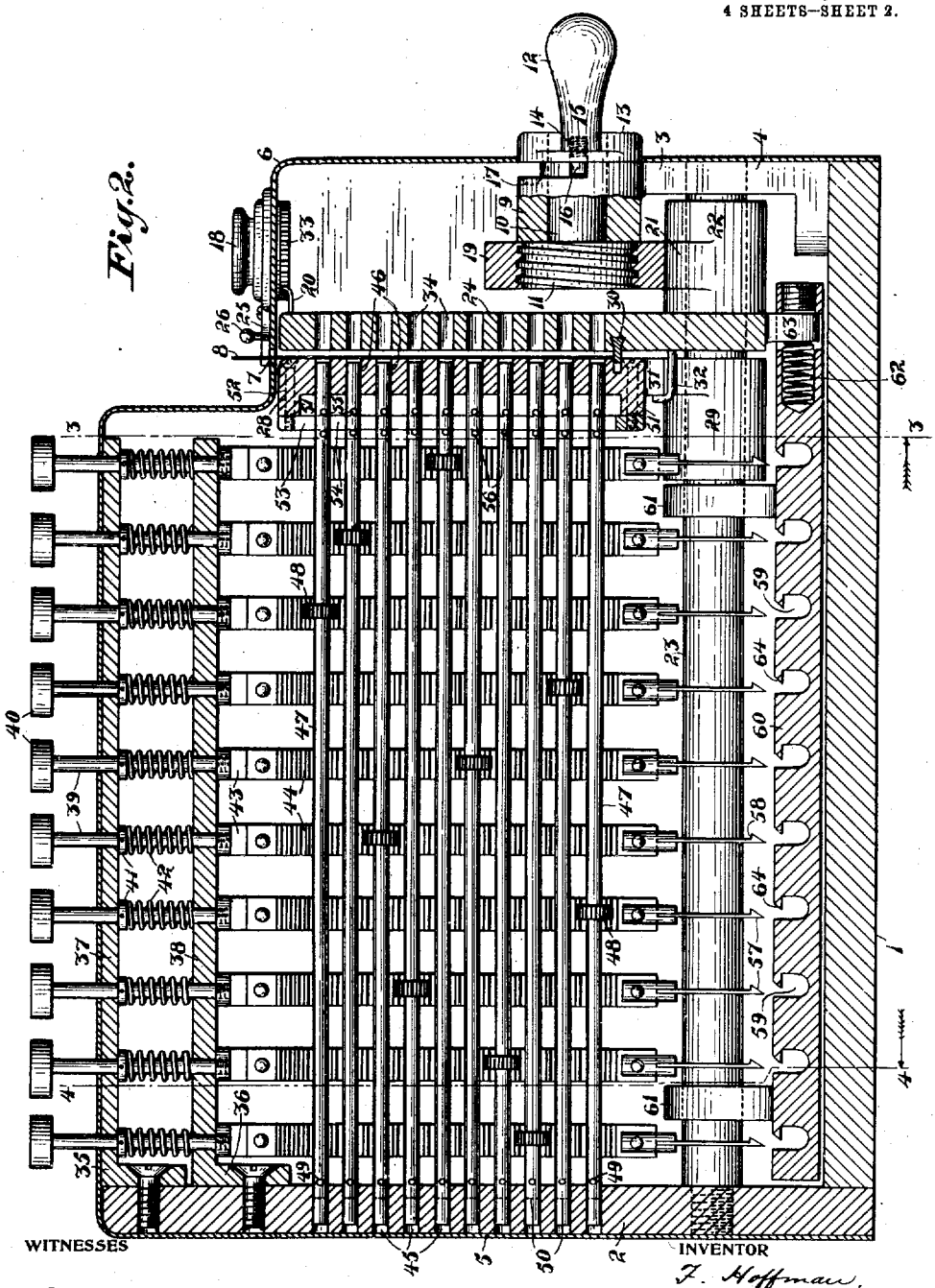
Figure 3:
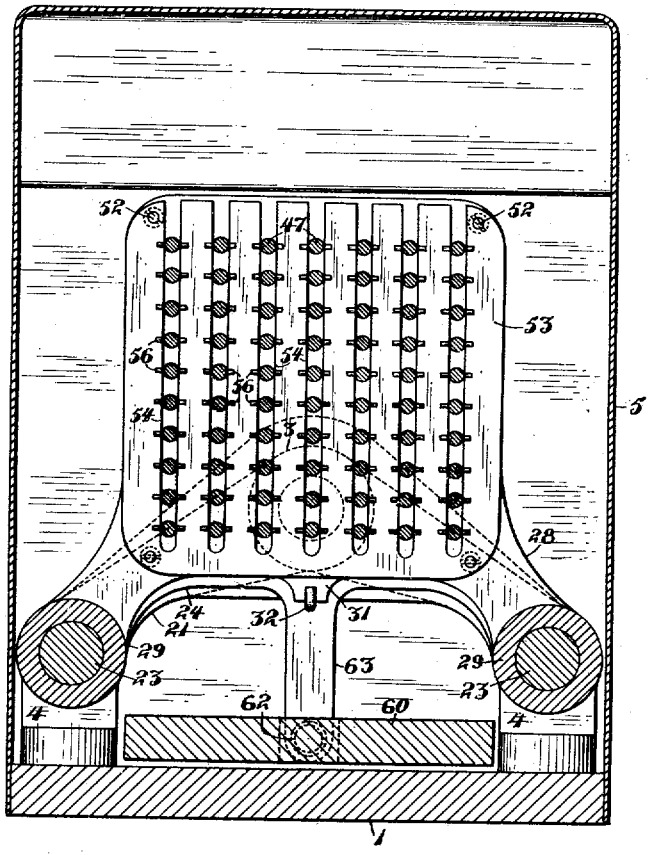
Figure 4:
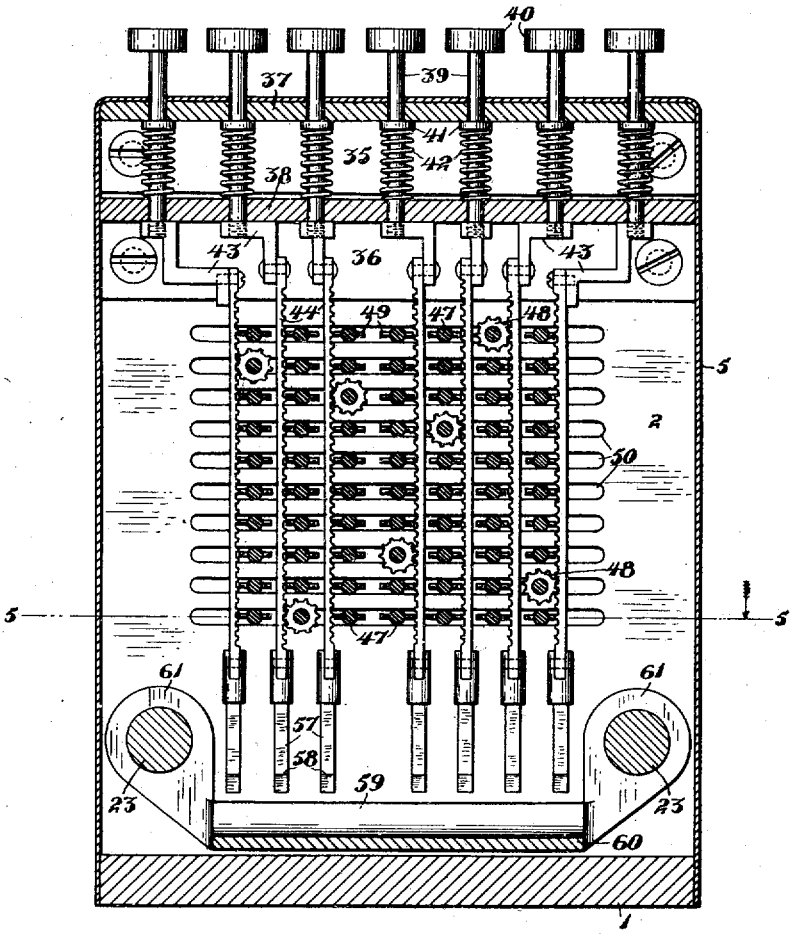
Figure 5:
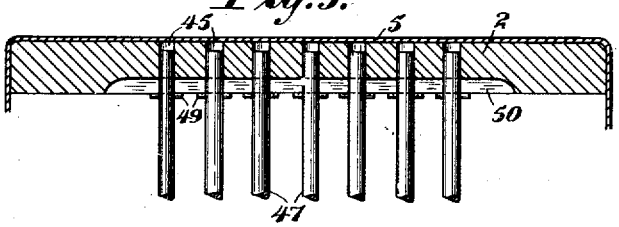

In the accompanying drawings, Figure 1 is a plan view of the machine; Fig. 2 is a longitudinal sectional view taken near the center; Fig. 3 is a cross section on the line 3—3 of Fig. 2; Fig. 4 is a cross section on the line 4—4 of Fig. 2; Fig. 5 is a horizontal section on the lines 5—5 of Figs. 2 and 4.

Referring to the drawing, 1 indicates a rectangular base, to which is secured, at the rear end, a rear plate 2, and upon which is secured, at the front end, a standard 3, having two legs 4. Secured upon said base is an inclosing casing 5, having a depressed front portion 6, in which is formed a transverse slot 7, said slot also extending down through one side of the casing, and being for the insertion of a check 8 or other paper which it is desired to identify.

The standard 3 is formed with a longitudinal cylindrical tubular extension 9, forming a hub for an operating stem 10 of a screw 11. Said stem 10 is turned by means of a crank handle 12 having a socket 13 secured upon the end of the stem, the rim of said socket having a recess 14, within which is a spring 15 and a pin 16 having a rounded head. Said pin, in the movement of said handle and stem, moves over a reduced or grooved arcuate path formed in the hub 5 and in length one half of a revolution. Said rounded end of the pin 16 is adapted to be pressed by said spring 15 into a round socket 17 formed in the hub midway of the path of the pin, thereby arresting the movement of the handle past this point. Said screw 11 screws into a nut 19, having depending and outwardly diverging arms 21, on the ends of which are formed sleeves 22 which slide upon cylindrical guide bars 23 secured between the standard 3 at the front end and the rear plate 2 at the rear end. Upon the rear ends of said sleeves 22 is secured a follower plate 24. By the turning of said handle and the screwing of said screw in said nut, said follower plate is moved rearwardly. Upon the top of the casing is pivoted a stop dog 25 having a handle 26 and a stop pin 27, which, when extended across said slot, arrests said check in the proper position for punching holes in the same. Said check, when so inserted, lies between a rest plate 28 at the rear side and the follower plate 24 at the front side, and it rests on a shelf 30 secured in the follower plate and extended into a slot in the rest plate. The rest plate 28 is supported by means of two sleeves 29 upon the longitudinal cylindrical guide bars 23, and loosely connected to the follower plate by means of a bent arm 32 extending from the latter which engages a tongue 31 depending from the rest plate. The plates 24 and 28 are, in the normal position of the machine, spaced a sufficient distance apart to permit of the easy insertion of the check or other paper therebetween. By the turning of said handle through one-fourth of a revolution, said follower plate is moved rearwardly, clamping the sheet of paper between the follower plate and the rest plate, and when the follower plate is returned to its original position, said rest plate also returns.

Secured to the rear plate of the machine, as shown at 35, 36, are upper and lower guide plates 37, 38, forming guides for stems 39 which project through the top of the casing and carry at their upper ends keys 40. These keys are arranged in rows and columns, the keys of each row being marked consecutively with the ten digits and all the keys of each column being marked with the same digit. In the machine as shown in the drawings there are seven of such rows and seventy keys in all. A coiled spring 42 around each stem is compressed between a collar 41 and the lower guide plate 38. The lower end of each stem projecting through the lower guide plate is secured to an angle bar 43 the lower portion of which is secured to the upper end of a vertical rack 44, of which there are therefore seventy. Adapted to slide in horizontal sockets 45 formed in the rear plate and in horizontal apertures 46 in the rest plate are horizontal plungers or punches 47 arranged in vertical planes, there being ten plungers in each plane, and as many vertical planes of plungers as there are rows of keys, in the present instance, seven. All the plungers of each plane correspond individually with the keys of a single row. The said rear plate is formed with horizontal grooves 50 each extending across the mouth of each row of sockets 45 for the plungers. To each plunger is secured a pinion 48, adapted to engage one of the racks of the corresponding row of keys, but said pinions are arranged irregularly upon the several plungers, so that the pinion on the uppermost plunger in a vertical plane may, for instance, mesh only with the eighth key in order of the corresponding row the next lower one with the ninth key, the next lower one with the fifth key and so on.

Since each plunger is operatively connected to one of the keys by reason of its pinion continuously engaging the rack movable with said key, it follows that the angular position of each plunger about its own axis depends upon the position of the corresponding key. In the raised position of the key, its plunger is in such a position that a pin 49 extending therethrough near its rear end is horizontal, or parallel with the horizontal groove 50 formed across the mouth of each row of sockets 45 in the rear plate. When in this position, said plunger can be pressed backward in said socket 45, the pin $49^m$ entering said horizontal groove. The diameter of the pinion is such that, when its key is fully depressed, its plunger is turned about its axis through a right angle, and the pin 49 at its rear end then extends in a vertical direction, so that the plunger cannot be pressed backward in its socket 45.

Secured by means of screws 52 on four posts 51 on the rest plate 28 is a retractor plate 53, formed with a series of vertical slots 54, said slots corresponding in number with the several rows of keys and vertical planes of plungers, and all of the plungers in the same vertical plane pass through a corresponding slot 54 in the retractor plate. Extending horizontally through each plunger in front of said retractor plate is a pin 55 and at the rear of said retractor plate is a pin 56. Said pins are therefore normally at right angles to said slots 54, so that, unless a key has been depressed, the corresponding plunger is connected to said retractor and rest plates and can move only therewith. But, if a key is fully depressed, so as to turn its plunger through a right angle, the said pins 55, 56, extend vertically, and the rest and retractor plates can move rearwardly without moving said plunger.

Secured to and depending from the lower end of each rack is a flat spring 57, formed at its lower end with a hook 58, which, when the key is depressed, is adapted to enter one of a series of transverse troughs 59 formed in a locking plate 60 suspended by hanger loops 61 from the guide bars 23, and movable longitudinally on said bars. Said locking plate is adapted to be moved rearwardly with the movement of the follower plate by a spring 62 abutting against a tongue 63 depending from the follower plate. Each trough is formed at the top of its front side with a rearwardly extending lip 64, which lip, when the locking plate is in its rearward position, is adapted to engage any hooks which may then be depressed and prevent withdrawal of the same.

To certify a check, the check is inserted in the slot 7 for the same, and the operator gives the handle 12 a quarter turn, which has the effect of clamping the check in position between the follower and rest plates, and also of moving the locking plate into its locking position. He then depresses in the first row the keys marked with figures constituting the countersign of the drawee, and in the last row the keys marked with figures constituting the countersign of the payee. If, as in the present instance, there are five intervening rows, then, neglecting cents, the machine will certify to any amount up to $99,999. The operator depresses in the second row the key which indicates the number of tens of thousands of dollars in the amount of the check, in the third row that key which indicates the thousands therein, in the fourth row that which indicates the hundreds therein, in the fifth row that which indicates the tens therein and in the sixth row that which indicates the units of dollars therein. As each key is depressed it is locked in its depressed position by the hook 58 secured to the corresponding rack engaging the lip 64 of the trough in the locking plate. The operator now turns the handle 12 through a second quarter of a turn, the effect of which is to advance the follower plate still farther, carrying with it the check. The plungers corresponding to those keys which have been depressed remain stationary, by reason of the pins 49 through their rear ends having been turned at right angles to the horizontal grooves 50 in the rear plate, and thus preventing any rearward movement of said plungers. To permit the follower plate to move while said plungers remain stationary, the follower plate is formed with apertures 34, one for each plunger. The other plungers, the keys of which have not been depressed, are free to move back, since their rear pins 49 are horizontal, and they are moved with the rest plate, which is itself moved by the pressure transmitted from the follower plate. As the follower plate moves on to the fixed plungers, the latter make perforations in the check and enter the apertures 34 in the follower plate. The positions of these perforations correspond to the particular keys which have been depressed, and when the check thus perforated is placed over a combination code card, which is in the possession of the person who is to make the payment, the numbers appearing therethrough correspond to the drawee's and payee's countersign and also to the amount of the check. The handle 12 is then returned to its normal position for a further operation.

The machine is provided with a combination lock 18, comprised of disks having holes 20 which, when in register with each other permit a catch 33 to pass therethrough and permit the machine to be used.

It is evident that the machine may be varied in form in many ways to suit different conditions.

I claim:—

1. A machine of the character described, comprising a frame having means for retaining a check or other sheet of paper in a desired position, a series of rows of keys having numbers marked thereon, a corresponding series of rows of punches for punching holes in the paper, each key of any one row being operatively related to one only of the corresponding row of punches, said punches being normally inoperative to punch said paper, means whereby the operation of each key renders the corresponding punch operative, and means for punching paper by the punches thus rendered operative.

2. A machine of the character described, comprising a frame provided with means for retaining a check or other sheet of paper in a desired position, a series of rows of keys, a corresponding series of rows of punches for punching holes in the paper, the keys of each row being operatively connected severally, but fortuitously, with all the punches of the corresponding row, said punches being normally inoperative to punch said paper, means whereby the operation of each key renders the corresponding punch operative, and means for punching paper by the punches thus rendered operative.

3. A machine of the character described comprising a frame having a slot adapted to receive a check or paper to be perforated, means for clamping said check or paper to be perforated, a series of rows of keys having numbers marked thereon, a corresponding series of rows of punches for punching holes in the paper, each key of any one row being operatively related to one only of the corresponding row of punches, said punches being normally inoperative to punch said paper, means whereby the operation of each key renders the corresponding punch operative, and means for punching paper by the punches thus rendered operative.

4. A machine of the character described, comprising a frame having a slot closed at one side to receive a check or paper to be perforated and to guide the same into position and a series of rows of keys having numbers marked thereon, a corresponding series of rows of punches for punching holes in the paper, each key of any one row being operatively related to one only of the corresponding row of punches, said punches being normally inoperative to punch said paper, means whereby the operation of each key renders the corresponding punch operative, and means for punching paper by the punches thus rendered operative.

5. A machine of the character described, comprising a frame having a slot closed at two sides to receive a check or paper to be perforated and to guide the same into position and a series of rows of keys having numbers marked thereon, a corresponding series of rows of punches for punching holes in the paper, each key of any one row being operatively related to one only of the corresponding row of punches, said punches being normally inoperative to punch said paper, means whereby the operation of each key renders the corresponding punch operative, and means for punching paper by the punches thus rendered operative.

6. A machine of the character described, comprising a frame having a support for a check or paper to be perforated, a series of rows of keys, a corresponding series of rows of punches for punching holes in the papers, said punches being normally inoperative to punch the paper, means whereby the operation of each key renders one only of the punches in the corresponding row operative, means for clamping the paper on its support, means operative, when said clamping means has been actuated to clamp said paper, to retain the keys when operated, said retaining means being automatically withdrawn and the keys released when the clamping means is restored to its unclamping position and means for punching the paper by the punches rendered operative.

7. In a machine of the character described, the combination of rows and columns of numeral keys, each row being marked with all the ten digits in order, a series of rows of racks corresponding to the rows of keys, each rack being connected to one of said keys, a series of rows of punch plungers each having secured thereon a pinion engaging one of said racks, said machine being formed with a receptacle for paper in proximity to the ends of said plungers, means for selectively rendering operative certain of said plungers by the depression of the corresponding keys, and means for punching holes in said paper by the plungers so rendered operative.

8. In a machine of the character described, the combination of a follower plate, a rest plate, arranged adjacent to said follower plate to receive therebetween a check, said follower plate having apertures to permit plungers to pass therethrough, plungers extending into apertures in the rest plate and arranged opposite to the apertures in the follower, numeral keys, means for selectively rendering certain of said plungers fixed by the depression of corresponding numeral keys, and means for advancing said follower plate to cause said plungers so fixed to punch holes in said paper.

9. In a machine of the character described, the combination of a follower plate, a rest plate, arranged adjacent to said follower plate to receive therebetween a check, said follower plate having apertures to permit plungers to pass therethrough, plungers extending into apertures in the rest plate and arranged opposite the apertures in the follower, numeral keys, means for selectively rendering certain of said plungers fixed by the depression of corresponding numeral keys, means for advancing said follower plate toward said plate to clamp the paper therebetween, and for further advancing said follower plate to cause said plungers so fixed to punch holes in said paper, and catches for the respective keys arranged to hold said keys in their depressed position when said follower plate has been partly advanced.

10. In a machine of the character described, the combination of a follower plate, a rest plate, arranged adjacent to said follower plate to receive therebetween a check, said follower plate having apertures to permit plungers to pass therethrough, plungers extending into apertures in the rest plate and arranged opposite the apertures in the follower, numeral keys, means for selectively rendering certain of said plungers fixed by the depression of corresponding numeral keys, means for advancing said follower plate toward said rest plate to clamp the paper therebetween, and for further advancing said follower plate to cause said plungers so fixed to punch holes in said paper, catches for the respective keys arranged to hold said keys in their depressed position when said follower plate has been partly advanced, and a device movable with the follower plate and arranged to engage said catches when the keys are so depressed, said device being adapted to return with the follower plate to release said catches.

11. A machine of the character described comprising a support for a check or other sheet of paper, means for forming variously located perforations in a paper supported thereby, individually operatable keys for severally controlling the operations of said means to form perforations in the respective locations, the keys having distinguishing marks thereon, arranged in regular order, and the operative ends of said means controlled by the respective keys being irregularly arranged.

FRED HOFFMAN.

Witnesses:
FRANCIS M. WRIGHT,
N. B. KEATING.

Copies of this patent may be obtained for five cents each, by addressing the "Commissioner of Patents, Washington, D. C."